(12) United States Patent
Shew et al.

(10) Patent No.: US 12,719,352 B2
(45) Date of Patent: Aug. 25, 2026

(54) POWER SUPPLY DEVICE INCLUDING VOLTAGE BOOSTING CIRCUIT

(71) Applicant: Microsoft Technology Licensing, LLC, Redmond, WA (US)

(72) Inventors: Geoffrey Jason Shew, Redmond, WA (US); Chee Kiong Fong, Saratoga, CA (US); Suet Fong Tin, Redmond, WA (US); Michael Roy Volkman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 18/157,046

(22) Filed: Jan. 19, 2023

(65) Prior Publication Data

US 2024/0250607 A1 Jul. 25, 2024

(51) Int. Cl.

| | |
|---|---|
| ***H02M 1/10*** | (2006.01) |
| ***H02M 1/00*** | (2006.01) |
| ***H02M 1/42*** | (2007.01) |
| ***H02M 3/00*** | (2006.01) |

(52) U.S. Cl.

CPC ............. *H02M 1/10* (2013.01); *H02M 1/007* (2021.05); *H02M 3/01* (2021.05); *H02M 1/4208* (2013.01)

(58) Field of Classification Search

CPC ................... H02M 1/007; H02M 1/10; H02M 1/42–4291; H02M 3/01; H02M 3/33569–33592

See application file for complete search history.

(56) References Cited

U.S. PATENT DOCUMENTS

| | | | | |
|---|---|---|---|---|
| 5,119,283 | A | 6/1992 | Steigerwald et al. | |
| 2003/0202368 | A1* | 10/2003 | Ierymenko .......... | H02M 1/4208 363/125 |
| 2011/0075459 | A1 | 3/2011 | Phadke | |

(Continued)

FOREIGN PATENT DOCUMENTS

| | | | |
|---|---|---|---|
| CN | 113595412 | A | 11/2021 |
| CN | 113258769 | A | 2/2023 |
| JP | 2017017775 | A | 1/2017 |

OTHER PUBLICATIONS

Machine translation of CN-113595412-A, orig. pub. Nov. 2, 2021. Obtained from https://worldwide.espacenet.com/ on Jan. 27, 2025. (Year: 2021).*

(Continued)

*Primary Examiner* — Fred E Finch, III
(74) *Attorney, Agent, or Firm* — Alleman Hall LLP

(57) ABSTRACT

Examples are disclosed that relate to a power supply device having improved power efficiency. In one example, a power supply device includes an electrical power interface configured to receive electrical power from a power source. A power factor correction (PFC) circuit is configured to increase a voltage of the electrical power from an input voltage to a converter voltage and increase a power factor of the power supply device. An LLC resonant converter is configured to regulate an output voltage based at least on the input voltage and a system load. A voltage boosting circuit is configured to turn off the PFC circuit and increase the voltage of the electrical power from the input voltage to the converter voltage based at least on an operating condition of the power supply device.

16 Claims, 6 Drawing Sheets

(56) References Cited

U.S. PATENT DOCUMENTS

| | | | | |
|---|---|---|---|---|
| 2016/0141951 | A1 | 5/2016 | Mao et al. | |
| 2020/0412238 | A1 | 12/2020 | Zhu et al. | |
| 2021/0249950 | A1* | 8/2021 | Kim | H02M 1/007 |
| 2021/0288574 | A1 | 9/2021 | Cohen | |
| 2021/0296982 | A1* | 9/2021 | Hafezinasab | H02M 3/1582 |
| 2023/0188031 | A1* | 6/2023 | Fong | H02M 1/4266 323/210 |

OTHER PUBLICATIONS

International Search Report and Written Opinion received for PCT Application No. PCT/US2023/083713, Apr. 8, 2024, 13 pages.

"Greenhouse Gas Equivalencies Calculator", Retrieved From: https://www.epa.gov/energy/greenhouse-gas-equivalencies-calculator, Mar. 2022, 4 Pages.

Timothy Owens, "Xbox One lifetime unit sales worldwide as of Jul. 2022, by region", Retrieved From: https://www.statista.com/statistics/1005418/xbox-one-console-unit-sales-country, Aug. 11, 2022, 7 Pages.

* cited by examiner

300
VOUT
348
SYSTEM LOAD
336
RECTIFIER CIRCUIT 344
342
FEEDBACK CIRCUIT 346
VCONVERTER
LLC RESONANT TANK CIRCUIT 340
316
N3
338
320
324
332
326
N2
ENABLE
328
322
318
PFC CIRCUIT 310
DISABLE
DETECTOR 334
330
312
308
314
N1
EMI FILTER 306
302
VIN
AC
304

POWER SUPPLY DEVICE INCLUDING VOLTAGE BOOSTING CIRCUIT

BACKGROUND

In a power supply device, switching transistors are vulnerable to significant power losses, conduction losses during transistor on time, and switching losses every time the transistor turns on or off. When a transistor is off, no power is dissipated. When a transistor is on, its low on-resistance keeps power dissipation to a minimum so long as the conduction currents are not significant. During switching intervals, when the transistor transitions from on to off state (or vice versa) the transistor passes through a linear region where its resistance is higher, which allows for dissipation of power.

SUMMARY

Examples are disclosed that relate to a power supply device having improved power efficiency. In one example, a power supply device includes an electrical power interface configured to receive electrical power from a power source. A power factor correction (PFC) circuit is configured to increase a voltage of the electrical power from an input voltage to a converter voltage and increase a power factor of the power supply device. An LLC resonant converter is configured to regulate an output voltage based at least on the input voltage and a system load. A voltage boosting circuit is configured to turn off the PFC circuit and increase the voltage of the electrical power from the input voltage to the converter voltage based at least on an operating condition of the power supply device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
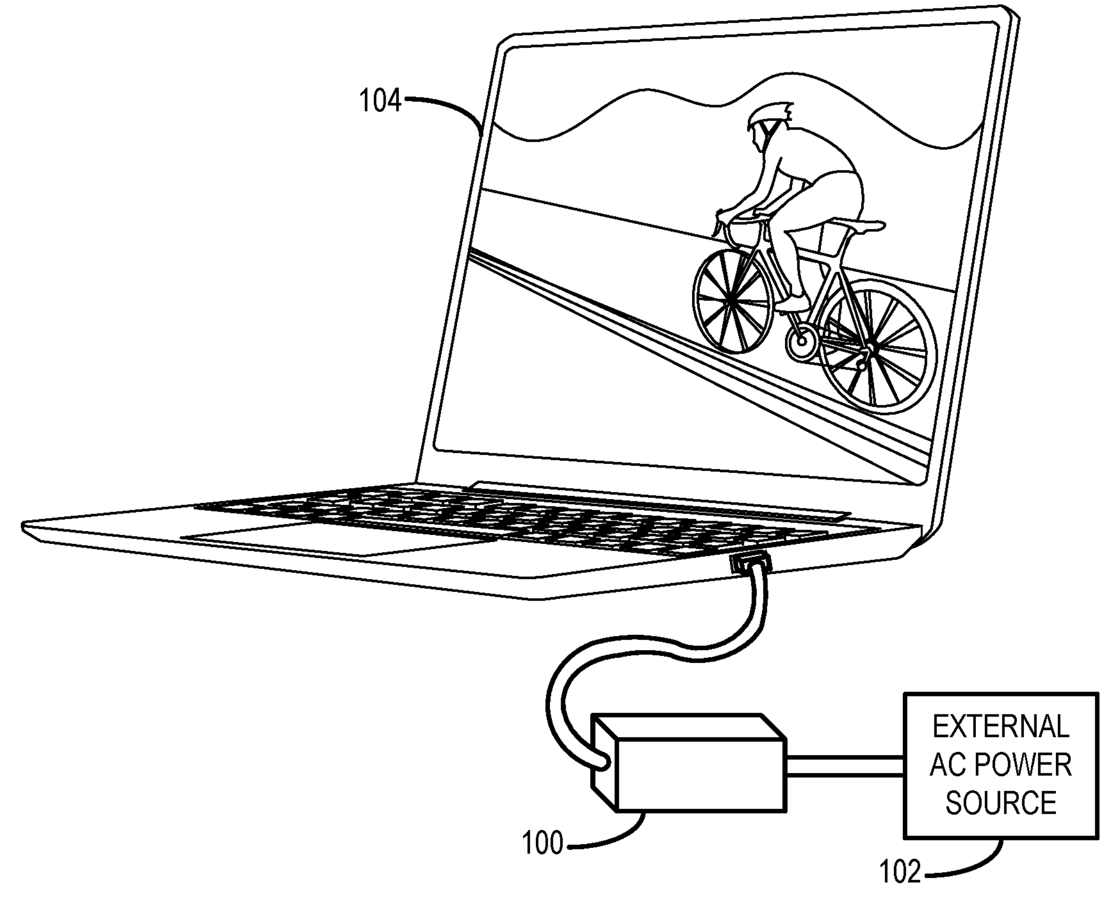
FIG. 1 shows an example power supply device of the present disclosure.

An LLC resonant converter can be employed in a power supply device to reduce power consumption of the power supply device relative to other types of power supply devices. The LLC resonant converter includes two inductances (Ls) and a capacitor (C). This configuration establishes a resonant tank circuit that has a gain that is controllable according to the switching frequency. The switching frequency can be modulated to produce a desired voltage conversion. The resonant voltage and current allow the opportunity to switch the transistors when either the voltage or current is close to zero. Such a condition is referred to as zero-voltage switching (ZVS) or zero-current switching (ZCS). Such operation of the LLC resonant converter is highly energy efficient. By switching during these ZVS and ZCS conditions, the transistor switching losses can be minimized enabling switching at higher frequencies. It then follows that the high frequency switching provided by the LLC resonant converter allows for a reduction in size of transformers and filters (and related components) as well as minimizes switching-transistor heat dissipation and the need for large heat sinks. All of these benefits are achieved while increasing the power supply device's overall power efficiency by using an LLC resonant converter in a power supply device.

It is desirable from a cost perspective to have a power supply device that is universally compatible with different geographic regions that have different electrical power regulatory standards and requirements. For example, different geographic regions have different alternating current (AC) line voltages (e.g., ranging from 100 volts in Japan to 240 volts in Europe). As another example, various geographic regions require that a power supply device have a minimum power factor (PF) for certain applications running at heavy loads. As yet another example, various geographic regions require that an input current's total harmonic distortion (THD) be less than a threshold distortion level. The cost of producing different power supply devices that are differently configured to meet the electrical power regulatory standards and requirements of each of the different geographic regions would be significant.

A power supply device may employ an LLC resonant converter to provide various benefits including reduced power consumption, reduced size, and reduced cost of production relative to other power supply devices having different configurations. The LLC resonant converter requires a relatively stable input voltage in order for the LLC resonant converter to operate efficiently and realize these benefits.

In order to meet the electrical power regulatory standards and requirements of the different geographic regions, a power supply device employing an LLC resonant converter further includes a power factor correction (PFC) circuit. The PFC circuit is configured to reduce harmonics to maintain a high power factor (PF) of the power supply device. The PFC circuit is further configured to modulate a voltage of electrical power from an input voltage to a converter voltage having characteristics that are suitable for the LLC resonant converter to operate efficiently. However, the PFC circuit increases power loss and reduces the power supply device's efficiency under some operating conditions.

The present disclosure is directed to a power supply device that includes a PFC circuit and a voltage boosting circuit. Either the PFC circuit or the voltage boosting circuit are used to increase a voltage of electrical power from an input voltage to a converter voltage that is suitable for efficient operation of the LLC resonant converter depending on the particular operating conditions of the power supply device. The voltage boosting circuit consumes less electrical power during operation than the PFC circuit. So, by turning off the PFC circuit under specific operating conditions and instead using the voltage boosting circuit to increase the voltage for the LLC resonant converter, overall power efficiency of the power supply device is improved while enabling the power supply device to be compatible for operation in different geographic regions having different electrical power regulatory standards and requirements.

FIG. 1 shows an example power supply device 100 of the present disclosure. The power supply device 100 receives alternating current (AC) electrical power from an external AC power source 102, such as an electrical socket. The power supply device 100 is configured to convert the AC electrical power received from the external AC power source 102 to direct current (DC) electrical power that is suitable for consumption by electronic device 104. In particular, the power supply device 100 includes a voltage boosting circuit 202 (shown in FIG. 2) that is selectively turned on during specific operating conditions of the power supply device 100 instead of a PFC circuit 210 (shown in FIG. 2) to increase a voltage from an input voltage to a converter voltage. The voltage boosting circuit 202 consumes less power than the PFC circuit 210, thereby increasing overall power efficiency of the power supply device 100.

In the illustrated example, the electronic device 104 is a laptop computer and the power supply device 100 is an external power supply device that is electrically connected to the laptop computer. In other implementations, the power supply device 100 may be integrated into an electronic device instead of being an external/peripheral device that can be disconnected from the electronic device. The power supply device 100 may be configured to efficiently provide electrical power to any suitable type of electronic device including, but not limited to, computers, TVs, appliances, and other electronic devices that require electrical power.

Figure 2:
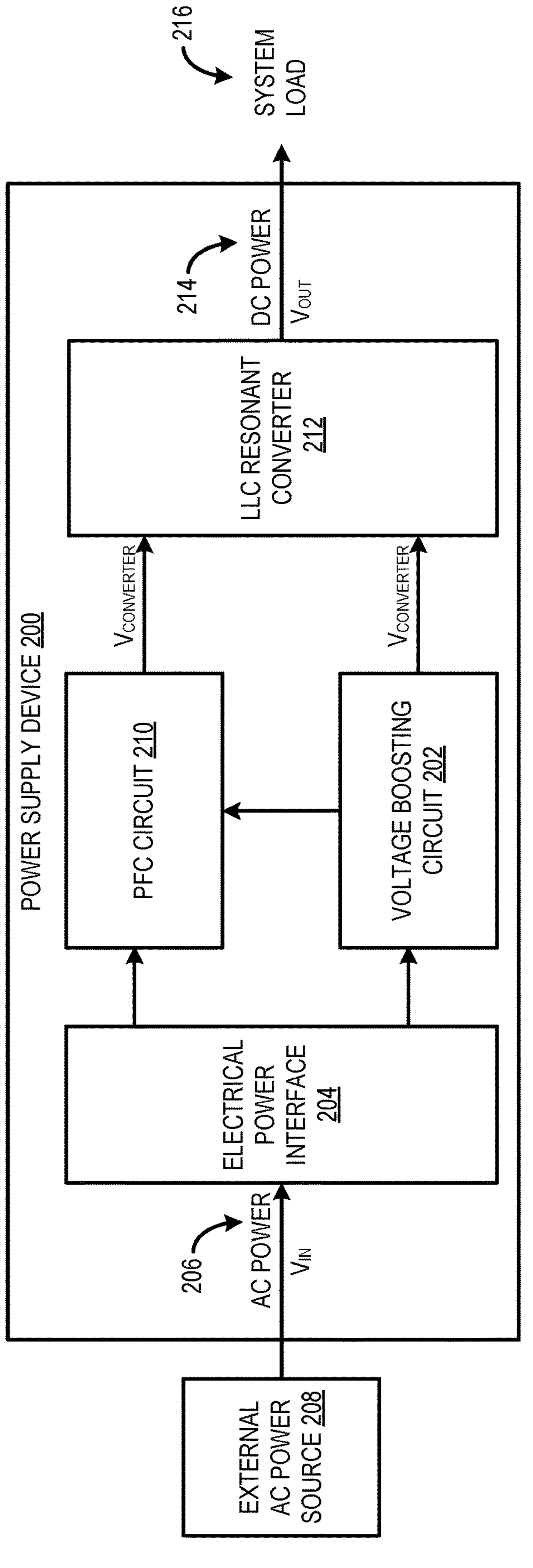
FIG. 2 shows a block diagram of a power supply device of the present disclosure.

FIG. 2 shows a block diagram of a power supply device 200 including a voltage boosting circuit 202. The power supply device 200 is shown in simplified form. For example, the power supply device 200 may be representative of the power supply device 100 shown in FIG. 1. The power supply device 200 includes an electrical power interface 204 configured to receive alternating current (AC) electrical power 206 from an external AC power source 208. For example, the external AC power source 208 may include an electrical socket electrically connected to an electrical power grid. Characteristics of the AC power 206 received by the electrical power interface 204 may depend on the geographic region in which the external AC power source 208 is located. For example, an AC line voltage of the AC electrical power can depend on the geographic region in which the external AC power source 208 is located. In some geographic regions the AC line voltage is approximately 100 Volts (e.g., in Japan) and in other geographic regions the AC line voltage is approximately 240 Volts (e.g., in Europe). Additionally or alternatively, a geographic region can have various regulatory requirements for power supply devices that electrically connect to a power grid within the geographic region. For example, a geographic region may have regulatory emissions and harmonics requirements.

The power supply device 200 is configured to operate efficiently in any geographic region even when the AC line voltage of the AC electrical power provided to the power supply device 200 differs between different geographic regions. Moreover, the power supply device 200 is configured to abide by the associated regulatory requirements of any of the different geographic regions. To that end, the power supply device includes a power factor correction (PFC) circuit 210 electrically connected to the electrical power interface 204. The PFC circuit 210 is configured to step up a voltage of the electrical power 206 from an input voltage ($V_{IN}$) (e.g., the AC line voltage) to a converter voltage ($V_{CONVERTER}$) that is suitable for an LLC resonant converter 212 of the power supply device 200. Further, the PFC circuit 210 is configured to increase or maintain a relatively high power factor of the power supply device 200 to meet regulatory requirements of the geographic region in which the power supply device 200 is being used.

In one example, the power factor of the power supply device 200 is a ratio of real power absorbed by a system load 216 relative to apparent power flowing in the power supply device 200. Real power is the average of the instantaneous product of voltage and current and represents the capacity of the electricity for performing work. Apparent power is the product of RMS current and voltage. Due to a non-linear load that distorts the wave shape of the current drawn from the AC power source 208, the apparent power may be greater than the real power, so more current flows between the AC power source and the power supply device than would be required to transfer real power alone. For example, a power factor magnitude of less than one indicates the voltage and current are not in phase, reducing the average product of the two. In this example, the PFC circuit 210 is configured to change the waveform of current drawn by the system load 216 to improve the power factor of the power supply device 200.

In some implementations, the PFC circuit 210 includes a boost converter that is configured to maintain a constant voltage at its output while drawing a current that is in phase with and at the same frequency as the AC line voltage. In other implementations, the PFC circuit 210 may include another type of converter such as a buck converter or a buck-boost.

The LLC resonant converter 212 is electrically connected to the PFC circuit 210. The LLC resonant converter 212 is configured to regulate an output voltage ($V_{OUT}$) of DC electrical power 214 output from the power supply device 200 based at least on the converter voltage and the system load 216. The PFC circuit 210 boosts the input voltage ($V_{IN}$) of electrical power provided to the LLC resonant converter 212 to the converter voltage ($V_{CONVERTER}$) that is suitably high enough (and having the suitable frequency) for the LLC resonant converter to operate efficiently. In one example, the converter voltage ($V_{CONVERTER}$) is at least 200 Volts. The LLC resonant converter 212 regulates the output voltage ($V_{OUT}$) of the DC electrical power 214 to meet the voltage requirements of the system load 216.

The system load 216 is representative of the amount of electrical power required to operate an electronic device that is electrically connected to the power supply device 200. Referring back to the example shown in FIG. 1, the system load is representative of the amount of electrical power required to operate the laptop computer. The system load 216 can vary based at least on the operating conditions of the electronic device. In one example, the system load 216 is higher under conditions where the electronic device is being used, and the system load 216 is lower under conditions where the electronic device is idle (e.g., in a sleep mode).

There are certain operating conditions where there is an opportunity to reduce power consumption of the power supply device 200 by turning off the PFC circuit 210 and instead using the voltage boosting circuit 202 to boost the voltage from the input voltage ($V_{IN}$) to the converter voltage ($V_{CONVERTER}$) that is suitable for the LLC resonant converter 212.

In one example, the voltage boosting circuit 202 is configured to detect an AC line voltage of the AC electrical power 206. Further, the voltage boosting circuit 202 is configured to turn off the PFC circuit 210 and increase a voltage of the electrical power from the input voltage ($V_{IN}$) to the converter voltage ($V_{CONVERTER}$) based at least on the AC line voltage being less than a threshold voltage. The threshold voltage may be set to any suitable voltage level. In one example, the threshold voltage is a voltage level corresponding to an AC line voltage that is low enough where any harmonics generated by the AC line voltage nominally affect performance of the power supply device 200 (and/or the power grid). For example, the threshold voltage level may be 120 Volts or less. Under such operating conditions, since the harmonics are nominal, the PFC circuit 210 does not have to be turned on to handle the harmonics. Thus, power efficiency of the power supply device 200 can be increased by turning off the PFC circuit 210 and using the more efficient voltage boosting circuit 202 instead to boost the voltage. In one example, the voltage boosting circuit 202 is configured to increase the input voltage ($V_{IN}$) such that the converter voltage ($V_{CONVERTER}$) is at least double the input voltage ($V_{IN}$).

In another example, the voltage boosting circuit 202 is configured to detect the system load 216. Further, the voltage boosting circuit 202 is configured to turn off the PFC circuit 210 and increase a voltage of the AC electrical power from the input voltage ($V_{IN}$) to the converter voltage ($V_{CONVERTER}$) based at least on the system load being less than a threshold load. Under such operating conditions, since the harmonics are nominal, the PFC circuit 210 does not have to be turned on to handle the harmonics. Thus, power efficiency of the power supply device 200 can be increased by turning off the PFC circuit 210 and using the more efficient voltage boosting circuit 202 instead to boost the voltage. In one example, the voltage boosting circuit 202 is configured to increase the input voltage ($V_{IN}$) such that the converter voltage ($V_{CONVERTER}$) is at least double the input voltage ($V_{IN}$).

The threshold load may be set to any suitable load level. In one example, the threshold load corresponds to a system load where the electronic device is idle or operating in a sleep mode. Typically, in a power supply device that does not include a voltage boosting circuit, under such conditions, the PFC circuit would still operate intermittently to meet the demands of the system load (e.g., based on a lower duty cycle). Such operation of the PFC circuit would still consume electrical power during such operation conditions. However, in the case of the power supply device 200, the PFC circuit 210 is turned off and the voltage boosting circuit 202 is used instead of the PFC circuit 210 to meet the demands of the system load 216. Operation of the voltage boosting circuit 202 consumes less electrical power than operation of the PFC circuit 210, so overall power efficiency of the power supply device 200 is increased relative to a power supply device in which the PFC circuit remains turned on during such operating conditions.

In one example, the term "turn off" as used in relation to controlling the PFC circuit 210 means placing the PFC circuit 210 in a state where the PFC circuit 210 consumes less (e.g., minimal or no) electrical power relative to an operating state where the PFC circuit 210 is turned on.

The voltage boosting circuit 202 may be used instead of the PFC circuit under any suitable operating conditions where the additional harmonic filtering/power factor correction/other functionality of the PFC circuit 210 is not necessary for efficient operation of the power supply device 200.

The voltage boosting circuit 202 provides the technical benefit of increasing overall power efficiency of the power supply device 200 by being used instead of the PFC circuit 210 to boost the voltage of electrical power provided to the LLC resonant converter 212 under operating conditions where the additional harmonic filtering/power factor correction functionality of the PFC circuit 210 is not necessary for efficient operation of the power supply device 200.

Figure 3:
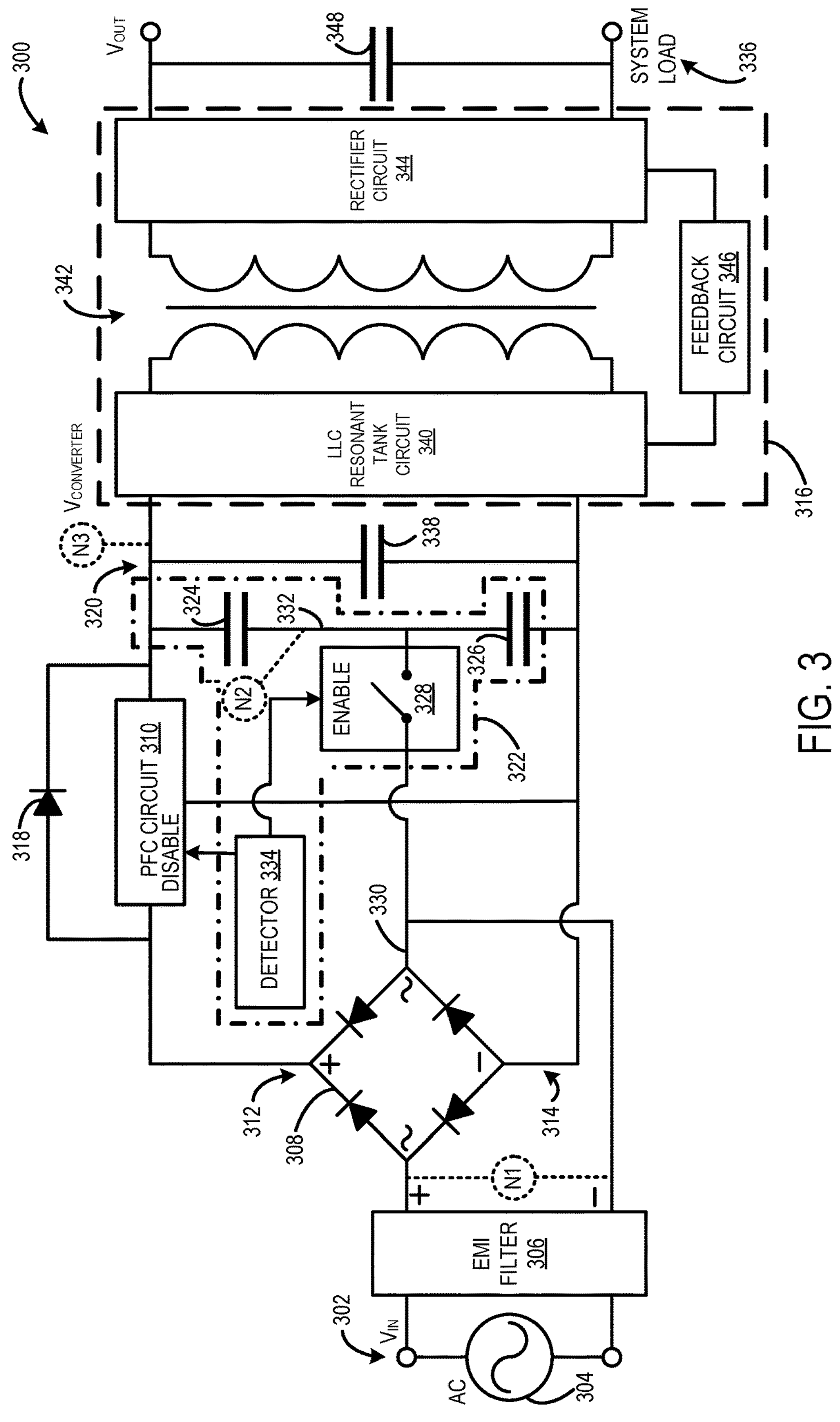
FIG. 3 shows a circuit diagram of an example power supply device of the present disclosure.

FIG. 3 shows a circuit diagram of an example power supply device 300. For example, the power supply device 300 may be representative of the power supply device 200 shown in FIG. 2. The power supply device 300 includes an electrical power interface 302 configured to receive alternating current (AC) electrical power from an AC power source 304.

An electromagnetic interference (EMI) filter 306 is electrically connected to the electrical power interface 302. The EMI filter 306 is configured to filter out electromagnetic noise in the AC electrical power received by the electrical power interface 302 to output filtered AC electrical power. The EMI filter 306 may include any suitable type of filter. In some implementations, the power supply device 300 may omitted the EMI filter.

A bridge rectifier 308 is electrically connected to the EMI filter 306. The bridge rectifier 308 is configured to receive the filtered AC electrical power from the EMI filter 306 and convert both polarities of the input waveform of the filtered AC electrical power to one of constant polarity (e.g., positive or negative) at its output. In other words, the bridge rectifier 308 outputs rectified electrical power having a pulsating DC waveform. In some examples, the bridge rectifier 308 yields a higher average output voltage relative to an input voltage ($V_{IN}$). In some implementations, a different electronic component may be used instead of a bridge rectifier to convert the AC electrical power to rectified DC electrical power.

A PFC circuit 310 is electrically connected to a positive output node 312 and a negative output node 314 of the bridge rectifier 308. The PFC circuit 310 is configured to increase a voltage of the rectified electrical power output from the bridge rectifier 308 from the input voltage ($V_{IN}$) (or an intermediate voltage) to a converter voltage ($V_{CONVERTER}$) that is provided at an input of an LLC resonant converter 316 that is electrically connected to the PFC circuit 310. Further, the PFC circuit 310 is configured to increase a power factor of the power supply device 300 or maintain a relatively high power factor of the power supply device 300 to meet regulatory requirements of the geographic region in which the power supply device 300 is being used. In one example, the PFC circuit 310 is configured to change a phase of the waveform of the rectified electrical power to improve the power factor of the power supply device 300.

The PFC circuit 310 may take any suitable form to increase or maintain a relatively high power factor of the power supply device 300. In some implementations, the PFC circuit 310 includes a boost converter. In other implementations, the PFC circuit 310 may include another type of converter such as a buck converter or a buck-boost.

A surge protection diode 318 is electrically connected between an input node 312 and an output node 320 of the PFC circuit 310. The surge protection diode 318 is configured to allow current to flow into the surge protection diode 318 and bypass the PFC circuit 310 during startup and surge conditions to protect the PFC circuit 310 during those conditions.

A voltage boosting circuit 322 is electrically intermediate the PFC circuit 310 and the LLC resonant converter 316. The voltage boosting circuit 322 includes a first capacitor 324 electrically connected in series with a second capacitor 326. The first and second capacitors 324, 326 are collectively electrically connected between the positive node 320 and the negative node 314. The voltage boosting circuit 322 includes a switch 328 that is electrically connected between a switching node 330 of the bridge rectifier 308 and an intermediate node 332 between the first capacitor 324 and the second capacitor 326. Such an arrangement of the switch 328 and the first and second capacitors 324, 326 provides an energy efficient way to boost the voltage, because the capacitors are passive electronic components and operation of the switch consumes minimal electrical power.

The voltage boosting circuit 322 includes a detector 334 configured to detect an operating condition of the power supply device 300 in which the PFC circuit 310 is turned off and the voltage boosting circuit 322 is used to boost the input voltage ($V_{IN}$) to the converter voltage ($V_{CONVERTER}$) that is provided at an input of an LLC resonant converter 316. The detector 334 may be implemented using any suitable logic, a microcontroller, and/or other suitable electronic components.

In some implementations, the detector 334 is configured to detect the input voltage ($V_{IN}$), and the operating condition includes the input voltage ($V_{IN}$) being less than a threshold voltage. The detector 334 is configured to turn off (or disable) the power factor correction circuit and turn on (or enable) the switch 328 based at least on the input voltage ($V_{IN}$) being less than the threshold voltage.

In some implementations, the detector 334 is configured to detect a system load 336, and the operating condition includes the system load 336 being less than a threshold load. The detector 334 is configured to turn off (or disable) the power factor correction circuit and turn on (or enable) the switch 328 based at least on the system load 336 being less than the threshold load.

The detector provides the technical benefit of detecting specific operating conditions where the full functionality of the PFC circuit 310 is not necessary and the voltage boosting circuit 322 can be used instead of the PFC circuit 310 to increase the voltage provided to the LLC resonant converter 316 in order to thereby increase the efficiency of the power supply device 300.

When the switch 328 is turned on and the PFC circuit 310 is turned off, the voltage boosting circuit 322 increases the input voltage ($V_{IN}$) (or an intermediate voltage) of the rectified electrical power to the converter voltage ($V_{CONVERTER}$) by accumulating charge at least in the first and second capacitors 324, 326. In some implementations, the voltage boosting circuit 322 is configured to increase the input voltage ($V_{IN}$) such that the converter voltage ($V_{CONVERTER}$) is at least double the input voltage ($V_{IN}$).

The capacitances of the first and second capacitors 324, 326 may be selected based on various factors. For example, the capacitances of the first and second capacitors 324, 326 can be optimized for cost vs efficacy. Larger capacitances of capacitances of the first and second capacitors 324, 326 provide greater efficiency and greater cost. On the other hand, smaller capacitances of the first and second capacitors 324, 326 provide lower cost and lower efficiency. The capacitances of the first and second capacitors 324, 326 may be selected based on any suitable factors. In other words, the arrangement of the first and second capacitors provide the technical benefit of providing design flexibility for the power supply device to balance cost and efficiency based on the particular application of the power supply device.

The power supply device 300 includes a bulk capacitor 338 electrically connected between the positive node 320 and the negative node 314. Charge is accumulated in the bulk capacitor 338 when the input voltage ($V_{IN}$) is increased to the converter voltage ($V_{CONVERTER}$) by either the PFC circuit 310 or the voltage boosting circuit 322. When the voltage boosting circuit 322 increases the input voltage ($V_{IN}$) to the converter voltage ($V_{CONVERTER}$) charge is accumulated on the first and second capacitors 324, 326 and the bulk capacitor 338.

Figure 4:
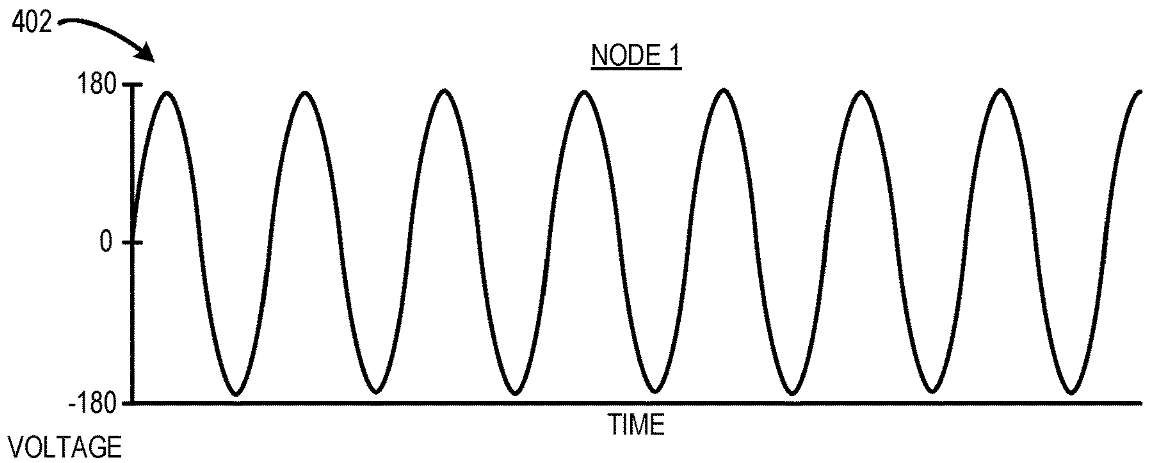
FIGS. 4-5 show timing diagrams corresponding to example waveforms at different nodes of a power supply device of the present disclosure during different operating conditions.
Figure 4:
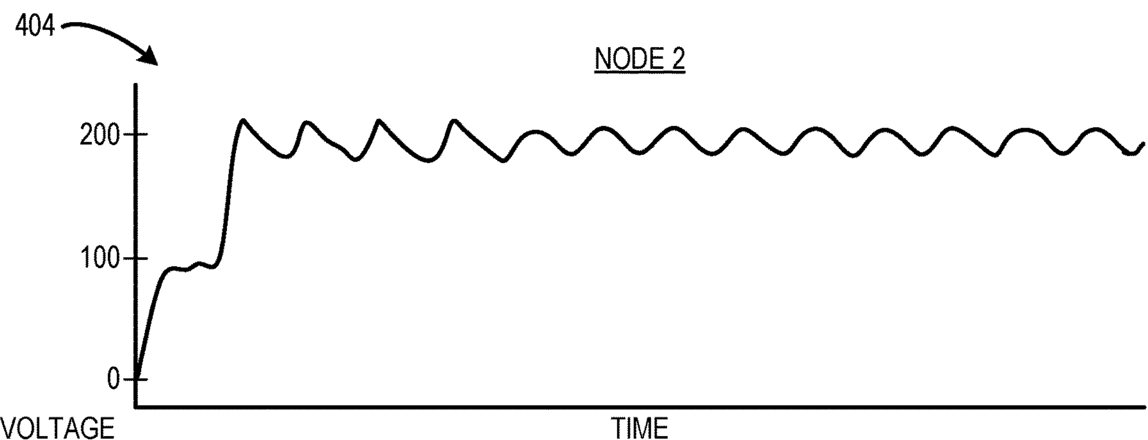
Figure 4:
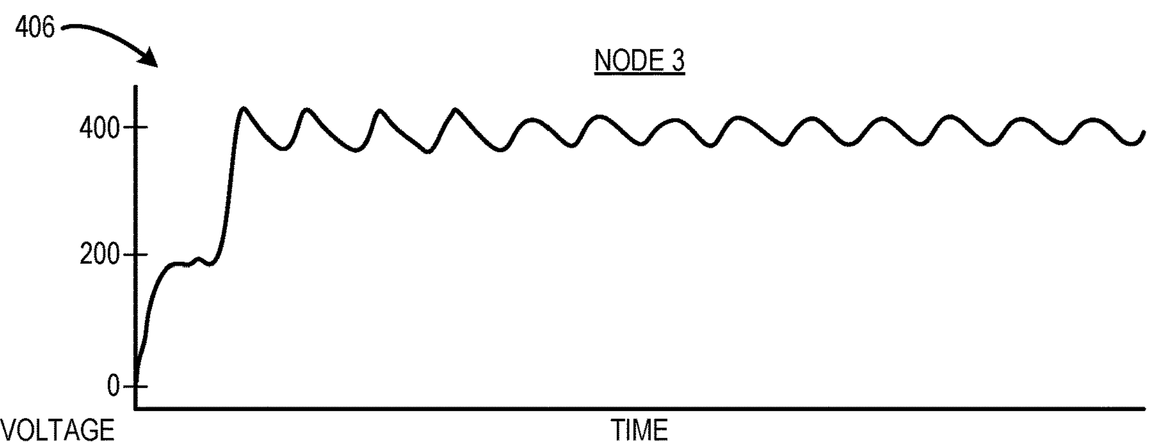
Figure 5:
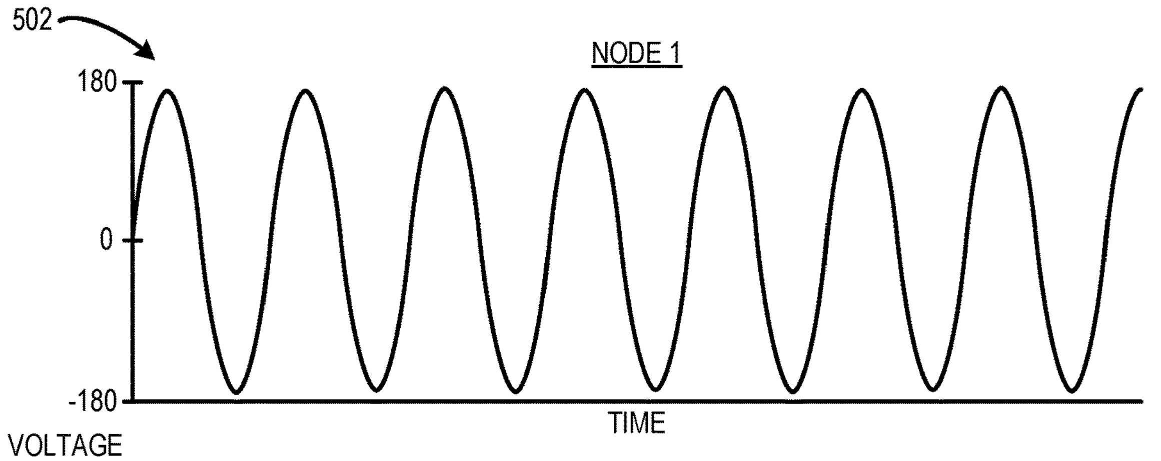
Figure 5:
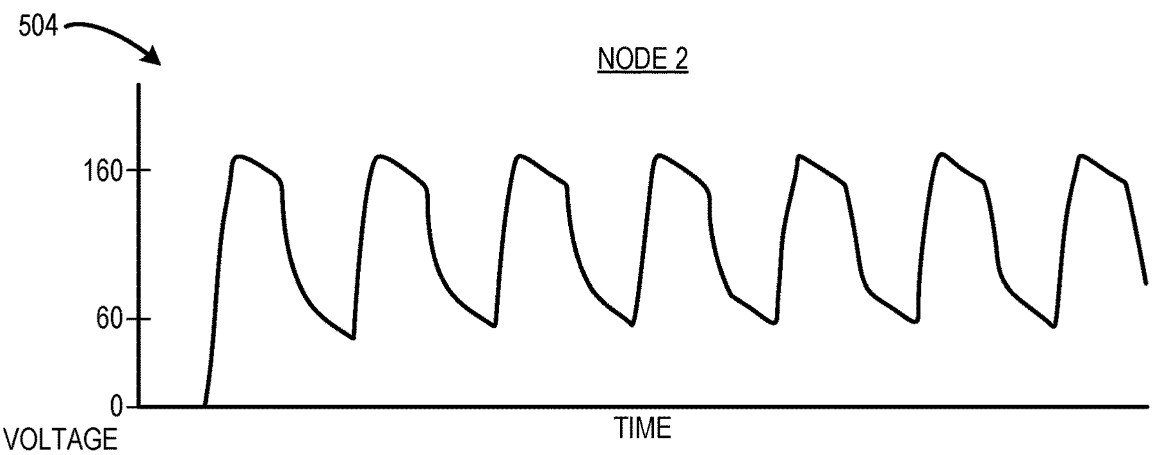
Figure 5:
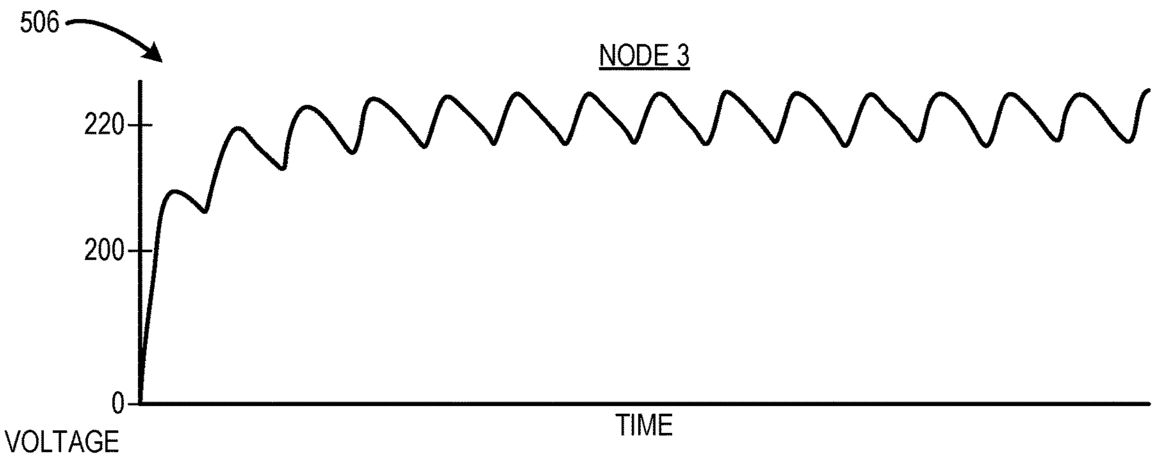

FIGS. 4-5 show timing diagrams corresponding to example waveforms at different nodes of the power supply device 300 during different operating conditions. A first node (N1) is located between positive and negative outputs of the EMI filter 306. A second node (N2) is located at the intermediate node 332 between the first and second capacitors 324, 326. A third node (N3) is located at the positive node 320 at the input of the LLC resonant converter 316.

FIG. 4 shows waveforms at the different nodes during operating conditions of the power supply device 300 where the PFC circuit 310 is turned on and the switch 328 of the voltage boosting circuit is turned off. Under such operation conditions, a waveform 402 at the first node (N1) is a sine wave (120 Vac, 60 Hz). The waveform 402 represents a filtered version of the electrical power received from the AC power source 304. A waveform 404 at the second node (N2) represents half the voltage at the output of the PFC circuit 310 ~200 Vdc. The waveform 406 at the third node (N3) represents the voltage at the output of the PFC circuit 310/the input of the LLC resonant circuit 316 ~400 Vdc. Under these operating conditions, the first and second capacitors 326, 324 are in series and act as supplementation bulk capacitors along with the bulk capacitor 338.

FIG. 5 shows waveforms at the different nodes during operating conditions of the power supply device 300 where the PFC circuit 310 is turned off and the switch 328 of the voltage boosting circuit is turned on. Under such operation conditions, a waveform 502 at the first node (N1) is a sine wave (120 Vac, 60 Hz). The waveform 502 represents a filtered version of the electrical power received from the AC power source 304. A waveform 504 at the second node (N2) represents a half wave rectified waveform output from the bridge rectifier 308. The waveform 506 at the third node (N3) represents the voltage at the input of the LLC resonant circuit 316 ~220 Vdc, which is approximately double the line voltage received from the AC power source 304. Under these operating conditions, the first and second capacitors 326, 324 connect to the bridge rectifier 308 and double the line voltage. Note that under these conditions, the voltage provided at the input of the LLC resonant circuit is suitably high enough for the LLC resonant circuit to operate efficiently and power efficiency gains can be achieved from the PCF circuit 310 being turned off.

Returning to FIG. 3, the LLC resonant converter 316 is electrically connected to the PFC circuit 310 and the voltage boosting circuit 322 via the positive node 320 and the negative node 314. The LLC resonant converter 316 is configured to regulate an output voltage ($V_{OUT}$) based at least on the converter voltage ($V_{CONVERTER}$) and the system load 336. The LLC resonant converter 316 includes an LLC resonant tank circuit 340, a transformer 342, a rectifier circuit 344, and a feedback circuit 346. The LLC resonant tank circuit 340 is configured to receive a waveform of the converter voltage ($V_{CONVERTER}$) to create a frequency modulated waveform which excites the LLC resonant tank circuit 340. The LLC resonant tank circuit 340 is configured to reduce the waveform's harmonics and outputs a sine wave with desired voltage gain. The transformer 342 is configured to receive the sine wave from the LLC resonant tank circuit 340. The transformer 342 is configured to further scale the voltage up or down based at least on the system load 336. The rectifier circuit 344 converts the sine wave into a stable DC output at the output voltage ($V_{OUT}$). An output capacitor

348 is electrically connected at the output of the rectifier circuit 344. The output capacitor 348 is configured to smooth the rectified voltage and current. The feedback circuit 346 is configured to compare the output voltage ($V_{OUT}$) with a reference voltage and adjust a modulating frequency (and/or other characteristics of the input waveform) based on the feedback.

The LLC resonant converter 316 enables soft switching in both the primary and secondary sides, increasing efficiency by reducing switching losses. In addition, the LLC resonant converter 316 may have a reduced form factor relative to other converter topologies, because the LLC resonant converter 316 does not have an output inductor. This means that the other inductors can be more easily integrated into a single magnetic structure to save area and cost. Moreover, when the inductive elements of the LLC resonant converter 316 are placed in the same structure, electromagnetic compatibility is improved, since it is easier and cheaper to shield one structure than multiple structures.

The power supply device 300 provides the technical benefit of increasing efficiency of the power supply device 300 during specific operating conditions where certain functionality of the PFC circuit 310 is not required for efficient operation of the power supply device 300 (e.g., low line voltages, low system loads). Specifically, in such operating conditions, the PFC circuit 310 is turned off and the voltage boosting circuit 322 is used instead to increase the voltage for the LLC resonant converter 316 more efficiently than the PFC circuit 310. Experimentation has shown that such a power supply device can provide a 4% or greater efficiency improvement relative to other power supply devices.

Note that in the illustrated implementation, various electronic components of the power supply device 300 are electrically intermediate other electronic components. As one example, the EMI filter 306 is electrically intermediate the electrical power interface 302 and the bridge rectifier 308. As another example, the voltage boosting circuit 322 is electrically intermediate the PFC circuit 310 and the LLC resonant converter 316. As yet another example, the bridge rectifier 308 is electrically intermediate the electrical power interface 302 and the PFC circuit 310. As yet another example, the switch 328 is electrically intermediate the switching node 330 of the bridge rectifier 308 and the intermediate node 332 between the first and second capacitors 324, 326. The illustrated implementation is provided as a non-limiting example. In other implementations, electronic components of the power supply device 300 may be arranged differently and/or different electronic components may be used instead of the illustrated electronic components.

Figure 6:
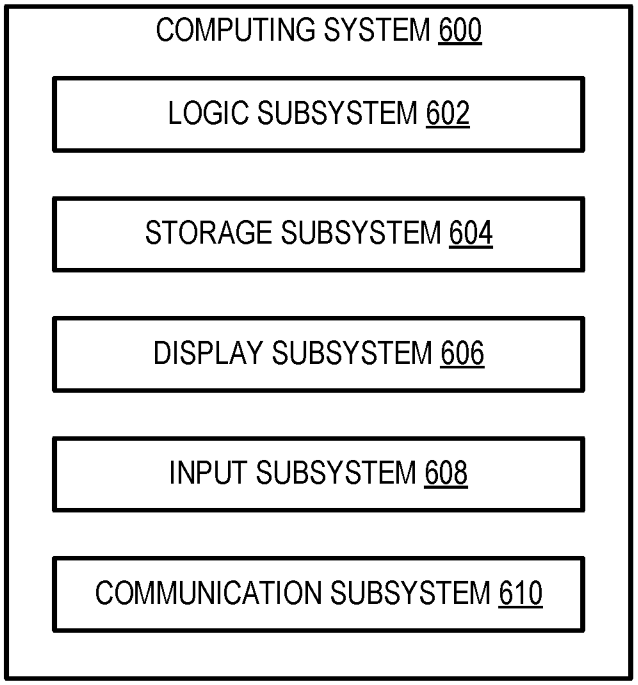
FIG. 6 shows an example computing system.

FIG. 6 schematically shows a simplified representation of a computing system 600 configured to provide any to all of the compute functionality described herein. For example, the computing system 600 may correspond to the power supply device 100 shown in FIG. 1, the laptop computer 104 shown in FIG. 1, the power supply device 200 shown in FIG. 2, and the power supply device 300 shown in FIG. 3. Computing system 600 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IOT) devices, embedded computing devices, power supply devices and/or other electronic devices.

Computing system 600 includes a logic subsystem 602 and a storage subsystem 604. Computing system 600 may optionally include a display subsystem 606, input subsystem 608, communication subsystem 610, and/or other subsystems not shown in FIG. 6.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

When included, display subsystem 606 may be used to present a visual representation of data held by storage subsystem 604. This visual representation may take the form of a graphical user interface (GUI). Display subsystem 606 may include one or more display devices utilizing virtually any type of technology. In some implementations, display subsystem may include one or more virtual-, augmented-, or mixed reality displays.

When included, input subsystem 608 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 may be configured to communicatively couple computing system 600 with one or more other computing devices. Communication subsystem 610 may include wired and/or wireless communication devices compatible with one or more different communication protocols. The communication subsystem may be configured for communication via personal-, local- and/or wide-area networks.

In an example, a power supply device, comprises an electrical power interface configured to receive electrical power from a power source, a power factor correction circuit configured to increase an input voltage of the electrical power to a converter voltage and increase a power factor of the power supply device, an LLC resonant converter electrically connected to the power factor correction circuit and configured to regulate an output voltage based at least on the converter voltage and a system load, and a voltage boosting circuit electrically intermediate the electrical power interface and the LLC resonant converter and configured to turn off the power factor correction circuit and increase the input voltage of the electrical power to the converter voltage based at least on an operating condition of the power supply device. In this example and/or other examples, the operating condition of the power supply device may include the input voltage of the electrical power being less than a threshold voltage. In this example and/or other examples, the operating condition of the power supply device may include the system load being less than a threshold load. In this example and/or other examples, the voltage boosting circuit may be configured to increase the input voltage such that the converter voltage is at least double the input voltage. In this example and/or other examples, the power source may be an alternating current (AC) power source, the electrical power may be AC electrical power, and the input voltage may be an AC line voltage of the AC electrical power. In this example and/or other examples, the LLC resonant converter may include a positive input node and a negative input node, and the voltage boosting circuit may include a first capacitor electrically connected in series with a second capacitor between the positive input node and the negative input node. In this example and/or other examples, the voltage boosting circuit may include a switch electrically connected to an intermediate node between the first capacitor and the second capacitor, and the voltage boosting circuit may be configured to turn on the switch based at least on the operating condition of the power supply device to increase the input voltage of the electrical power to the converter voltage by accumulating charge at least in the first and second capacitors. In this example and/or other examples, the voltage boosting circuit may include a detector configured to turn off the power factor correction circuit and turn on the switch based at least on one or more of the input voltage being less than a threshold voltage and the system load being less than a threshold load. In this example and/or other examples, the power supply device may further comprise a bridge rectifier electrically intermediate the electrical power interface and the power factor correction circuit, and wherein the switch of the voltage boosting circuit is electrically intermediate a node of the bridge rectifier and the intermediate node. In this example and/or other examples, the power supply device may further comprise an electromagnetic interference filter electrically intermediate the electrical power interface and the bridge rectifier and configured to filter out electromagnetic noise in the AC electrical power received by the electrical power interface.

In another example, a power supply device comprises an electrical power interface configured to receive electrical power from a power source, a power factor correction circuit electrically connected to the electrical power interface and configured to increase a voltage of the electrical power from an input voltage to a converter voltage and increase a power factor of the power supply device, an LLC resonant converter electrically connected to the power factor correction circuit and configured to regulate an output voltage based at least on the converter voltage and a system load, and a voltage boosting circuit electrically intermediate the electrical power interface and the LLC resonant converter and configured to turn off the power factor correction circuit and increase the input voltage of the electrical power to the converter voltage based at least on one or more of the input voltage being less than a threshold voltage and the system load being less than a threshold load. In this example and/or other examples, the power source may be an alternating current (AC) power source, the electrical power may be AC electrical power, and the input voltage may be an AC line voltage of the AC electrical power. In this example and/or other examples, the voltage boosting circuit may be configured to increase the input voltage such that the converter voltage is at least double the input voltage. In this example and/or other examples, the LLC resonant converter may include a positive input node and a negative input node, and the voltage boosting circuit may include a first capacitor electrically connected in series with a second capacitor between the positive input node and the negative input node. In this example and/or other examples, the voltage boosting circuit may include a switch electrically connected to an intermediate node between the first capacitor and the second capacitor, and wherein the voltage boosting circuit is configured to turn on the switch based at least on one or more of the input voltage being less than the threshold voltage and the system load being less than the threshold load to increase the input voltage to the converter voltage by accumulating charge at least in the first and second capacitors. In this example and/or other examples, the voltage boosting circuit may include a detector configured to turn off the power factor correction circuit and turn on the switch based at least on one or more of the input voltage being less than the threshold voltage and the system load being less than the threshold load.

In yet another example, a power supply device comprises an electrical power interface configured to receive alternating current (AC) electrical power from an AC power source, an electromagnetic interference filter electrically connected to the electrical power interface and configured to filter out electromagnetic noise in the AC electrical power received by the electrical power interface to output filtered AC electrical power, a bridge rectifier electrically connected to the electromagnetic interference filter and configured to rectify the filtered AC electrical power to output rectified electrical power, a power factor correction circuit electrically connected to the bridge rectifier and configured to increase a voltage of the rectified electrical power from an input voltage to a converter voltage and increase a power factor of the power supply device, an LLC resonant converter electrically connected to the power factor correction circuit and configured to regulate an output voltage based at least on the converter voltage and a system load, and a voltage boosting circuit electrically intermediate the electrical power interface and the LLC resonant converter and configured to turn off the power factor correction circuit and increase the voltage of the rectified electrical power from the input voltage to the converter voltage based at least on an operating condition of the power supply device. In this example and/or other examples, the LLC resonant converter may include a positive input node and a negative input node, and wherein the voltage boosting circuit includes a first capacitor electrically connected in series with a second capacitor between the positive input node and the negative input node. In this example and/or other examples, the voltage boosting circuit may include a switch electrically connected to an intermediate node between the first capacitor and the second capacitor, and wherein the voltage boosting circuit is configured to turn on the switch based at least on the operating condition of the power supply device to increase the voltage of the rectified electrical power from the input voltage to the converter voltage by accumulating charge in at least the first and second capacitors. In this example and/or other examples, the voltage boosting circuit may include a detector configured to turn off the power factor correction circuit and turn on the switch based at least on one or more of the input voltage being less than a threshold voltage and the system load being less than a threshold load.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A power supply device, comprising:

an electrical power interface configured to receive electrical power from a power source;

a power factor correction circuit configured to increase an input voltage of the electrical power to a first converter voltage and increase a power factor of the power supply device;

an LLC resonant converter including a positive input node and a negative input node electrically connected to the power factor correction circuit and configured to regulate an output voltage based at least on a delivered converter voltage and a system load;

a voltage boosting circuit electrically intermediate the electrical power interface and the LLC resonant converter, wherein the voltage boosting circuit is configured to increase an input voltage of the electrical power to a second converter voltage, and wherein the voltage boosting circuit includes a first capacitor and a second capacitor electrically connected in series between the positive input node and the negative input node of the LLC resonant converter, and a switch electrically connected to an intermediate node between the first capacitor and the second capacitor; and a detector configured to:

responsive to a first operating condition of the power supply device, turn the power factor correction circuit on and the switch off to deliver the first converter voltage from the power factor correction circuit to the LLC resonant converter supplemented by charge accumulated at the first capacitor and the second capacitor as the delivered converter voltage, and responsive to a second operating condition of the power supply device, turn the power factor correction circuit off and the switch on to deliver the second converter voltage as the delivered converter voltage from the voltage boosting circuit to the LLC resonant converter via charge accumulated at the first capacitor and the second capacitor.

2. The power supply device of claim 1, wherein the second operating condition of the power supply device includes the input voltage of the electrical power being less than a threshold voltage.

3. The power supply device of claim 1, wherein the second operating condition of the power supply device includes the system load being less than a threshold load.

4. The power supply device of claim 1, wherein the second converter voltage provided by the voltage boosting circuit is dependent on the input voltage; and wherein the first converter voltage provided by the power factor correction circuit is a constant voltage.

5. The power supply device of claim 1, wherein the power source is an alternating current (AC) power source, wherein the electrical power is AC electrical power, and wherein the input voltage is an AC line voltage of the AC electrical power.

6. The power supply device of claim 1, further comprising a bridge rectifier electrically intermediate the electrical power interface and the power factor correction circuit, wherein the bridge rectifier includes a positive output node, a negative output node, and a switching node, wherein the power factor correction circuit is electrically connected to the positive output node and the negative output node of the bridge rectifier, and wherein the switch of the voltage boosting circuit is electrically connected to the switching node of the bridge rectifier and the intermediate node.

7. The power supply device of claim 1, further comprising an electromagnetic interference filter electrically connected to the electrical power interface and configured to filter out electromagnetic noise in the electrical power received by the electrical power interface.

8. A power supply device, comprising:

an electrical power interface configured to receive electrical power from a power source;

a power factor correction circuit electrically connected to the electrical power interface and configured to increase a voltage of the electrical power from an input voltage to a first converter voltage and increase a power factor of the power supply device;

an LLC resonant converter including a positive input node and a negative input node electrically connected to the power factor correction circuit and configured to regulate an output voltage based at least on a delivered converter voltage and a system load;

a voltage boosting circuit electrically intermediate the electrical power interface and the LLC resonant converter, wherein the voltage boosting circuit is configured to increase an input voltage of the electrical power to a second converter voltage, and wherein the voltage boosting circuit includes a first capacitor and a second capacitor electrically connected in series between the positive input node and the negative input node of the LLC resonant converter, and a switch electrically connected to an intermediate node between the first capacitor and the second capacitor; and a detector configured to:

responsive to one or more of the input voltage being greater than a threshold voltage and the system load being greater than a threshold load, turn the power factor correction circuit on and the switch off to deliver the first converter voltage from the power factor correction circuit to the LLC resonant converter supplemented by charge accumulated at the first capacitor and the second capacitor as the delivered converter voltage, and responsive to one or more of the input voltage being less than the threshold voltage and the system load being less than the threshold load, turn the power factor correction circuit off and the switch on to deliver the second converter voltage as the delivered converter voltage from the voltage boosting circuit to the LLC resonant converter via charge accumulated at the first capacitor and the second capacitor.

9. The power supply device of claim 8, wherein the power source is an alternating current (AC) power source, wherein the electrical power is AC electrical power, and wherein the input voltage is an AC line voltage of the AC electrical power.

10. The power supply device of claim 8, wherein the second converter voltage provided by the voltage boosting circuit is dependent on the input voltage; and wherein the first converter voltage provided by the power factor correction circuit is a constant voltage.

11. The power supply device of claim 8, further comprising a bridge rectifier electrically intermediate the electrical power interface and the power factor correction circuit, wherein the bridge rectifier includes a positive output node, a negative output node, and a switching node, wherein the power factor correction circuit is electrically connected to the positive output node and the negative output node of the bridge rectifier, and wherein the switch of the voltage boosting circuit is electrically connected to the switching node of the bridge rectifier and the intermediate node.

12. The power supply device of claim 8, further comprising an electromagnetic interference filter electrically connected to the electrical power interface and configured to filter out electromagnetic noise in the electrical power received by the electrical power interface.

13. A power supply device, comprising:

an electrical power interface configured to receive alternating current (AC) electrical power from an AC power source;

an electromagnetic interference filter electrically connected to the electrical power interface and configured to filter out electromagnetic noise in the AC electrical power received by the electrical power interface to output filtered AC electrical power;

a bridge rectifier electrically connected to the electromagnetic interference filter and configured to rectify the filtered AC electrical power to output rectified electrical power;

a power factor correction circuit electrically connected to the bridge rectifier and configured to increase a voltage of the rectified electrical power from an input voltage to a first converter voltage and increase a power factor of the power supply device;

an LLC resonant converter including a positive input node and a negative input node electrically connected to the power factor correction circuit and configured to regulate an output voltage based at least on a delivered converter voltage and a system load;

a voltage boosting circuit electrically intermediate the electrical power interface and the LLC resonant converter, wherein the voltage boosting circuit is configured to increase the voltage of the rectified electrical power to a second converter voltage, and wherein the voltage boosting circuit includes a first capacitor and a second capacitor electrically connected in series between the positive input node and the negative input node of the LLC resonant converter, and a switch electrically connected to an intermediate node between the first capacitor and the second capacitor; and a detector configured to:

responsive to a first operating condition of the power supply device, turn the power factor correction circuit on and the switch off to deliver the first converter voltage from the power factor correction circuit to the LLC resonant converter supplemented by charge accumulated at the first capacitor and the second capacitor as the delivered converter voltage, and responsive to a second operating condition of the power supply device, turn the power factor correction circuit off and the switch on to deliver the second converter voltage as the delivered converter voltage from the voltage boosting circuit to the LLC resonant converter via charge accumulated at the first capacitor and the second capacitor.

14. The power supply device of claim 13, wherein the second operating condition of the power supply device includes the input voltage of the electrical power being less than a threshold voltage.

15. The power supply device of claim 13, wherein the second operating condition of the power supply device includes the system load being less than a threshold load.

16. The power supply device of claim 13, wherein the second converter voltage provided by the voltage boosting circuit is dependent on the input voltage; and wherein the first converter voltage provided by the power factor correction circuit is a constant voltage.

* * * * *